United States Patent [19]
Kim

[11] Patent Number: 5,979,836
[45] Date of Patent: Nov. 9, 1999

[54] PANEL DETACHING APPARATUS FOR CAR-MOUNTED AUDIO SYSTEM

[75] Inventor: Sung-Seop Kim, Kyunggi-Do, Rep. of Korea

[73] Assignee: Daewoo Electronics Co., Ltd., Seoul, Rep. of Korea

[21] Appl. No.: 08/998,831

[22] Filed: Dec. 29, 1997

[30] Foreign Application Priority Data

Dec. 30, 1996 [KR] Rep. of Korea ....................... 96-77251

[51] Int. Cl.$^6$ ........................................................ G12B 9/00
[52] U.S. Cl. .......................................... 248/27.3; 248/27.1
[58] Field of Search ................................... 248/27.1, 27.3

[56] References Cited

U.S. PATENT DOCUMENTS

| 4,868,715 | 9/1989 | Putman et al. | 248/27.3 |
| 4,895,326 | 1/1990 | Nimpoeno et al. | 248/27.1 |
| 4,993,668 | 2/1991 | Inamura | 248/27.3 |

Primary Examiner—Ramon O. Ramirez
Assistant Examiner—Willie Berry, Jr.
Attorney, Agent, or Firm—Smith, Gambrell & Russell, LLP; Beveridge, DeGrandi, Weilacher & Young

[57] ABSTRACT

First and second elastic holding members are installed symmetrically with each other on the front face of the escutcheon for receiving the front panel of the car-mounted audio system. The first and second elastic holding members have respectively first and second elastic members projected on the escutcheon. First and second holding rods are respectively formed at top parts of the elastic members. First and second engagement recesses are formed on both side faces of the front panel at corresponding positions to the first and second holding rods. By an operation for pushing the front panel onto the escutcheon, the first and second elastic members are hooked in the first and second engagement recesses while the first and second elastic members have elastic restoring forces working toward each other, and thereby the front panel is mounted onto the escutcheon.

11 Claims, 4 Drawing Sheets

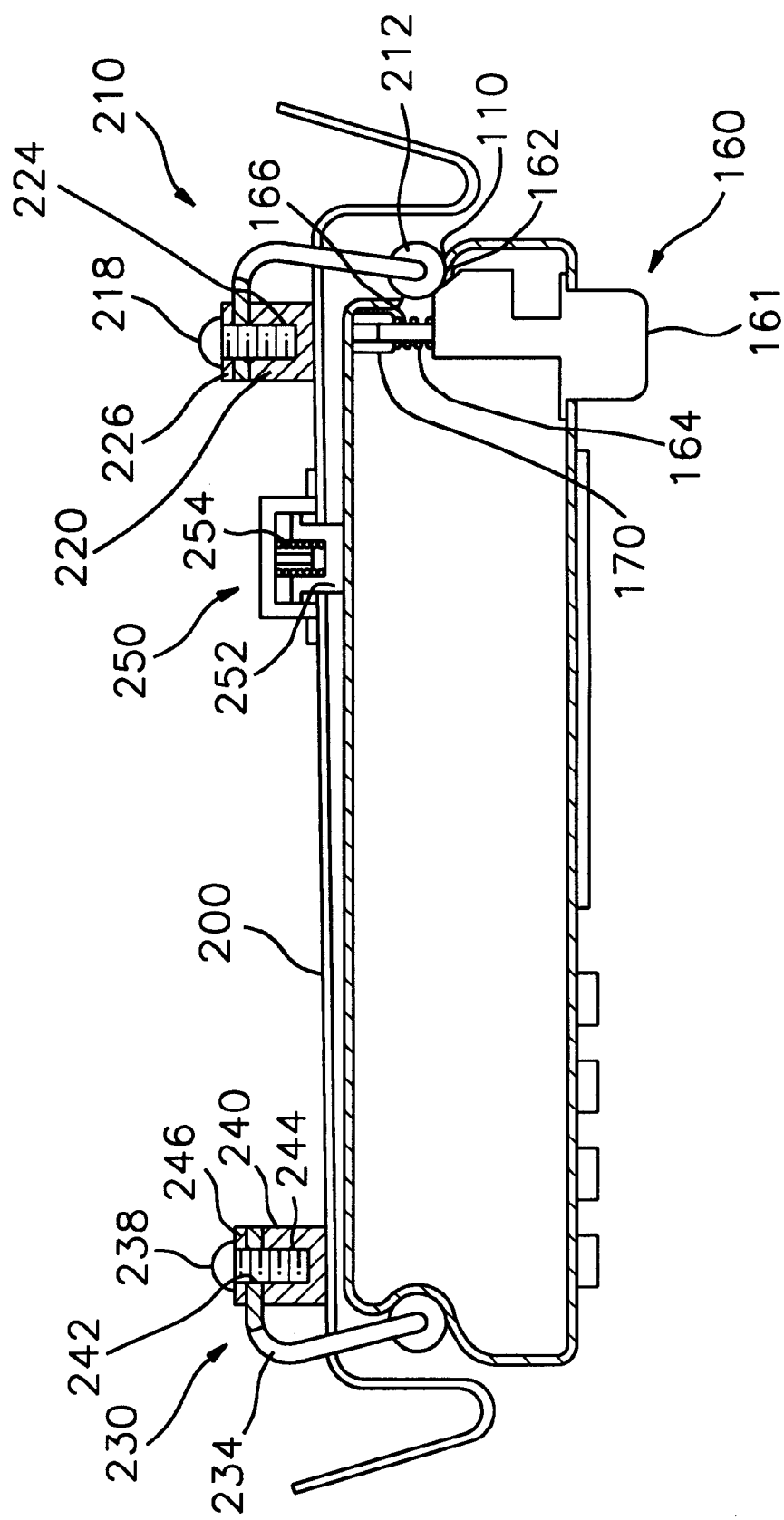

PANEL DETACHING APPARATUS FOR CAR-MOUNTED AUDIO SYSTEM

BACKGROUND OF THE INVENTION

1. Field of the Invention

The present invention relates to a panel detaching apparatus for a car-mounted audio system, and more particularly, to a panel detaching apparatus for a car-mounted audio system capable of detaching a panel installed in a front face of the car-mounted audio system from the car-mounted audio system body for preventing the car-mounted audio system from being stolen.

2. Description of the Prior Art

Recently developed audio devices are generally compact. Especially, audio devices installed in a car or the like must be compact and thin due to the space limitations. The panel installed in the front side of the audio device comprises a liquid crystal display (hereinafter, referred as LCD) to display information about the operation of the audio device, function knobs to indicate the operation, a recording medium inserting slot, and the like. When a driver leaves his or her car installed with the car audio having the panel, and to insure that the audio equipments cannot be used without the panel if stolen to thereby discourage possible theft by detaching the panel from the escutcheon, several devices have been proposed.

In the appended figures, FIG. 1 is a perspective view of a conventional panel detaching apparatus for a car-mounted audio system.

An escutcheon 10 for receiving a front panel 20 is formed at the front of car audio system body.

First engagement holes or recesses 24 are formed at one side part of the front panel 20. A hook assembly 50 for hooking the side part of the front panel 20 is installed in corresponding position of a back face of the escutcheon 10. The front panel is received in the escutcheon 10.

The hook assembly 50 has a longitudinal shaft 52 of which both ends are fixed at one side wall of the escutcheon 10 so that the hook assembly 50 can be rotatable on its longitudinal shaft 52. The hook assembly 50 has a rotating piece 58 and first hooked projectors 54 integrally extended from the longitudinal shaft 52. When the rotating piece 58 is pressed by an ejecting knob 60, the hook assembly 50 is rotated integrally with the rotating piece 58, and then the first hooked projectors 54 are rotated to be released from the first engagement holes 24 of the front panel 20. A restoring spring 56 installed on the top of the hook assembly 50 serves to restore the hook assembly 50 so that the first hooked projectors 54 return to hook the first engagement holes 24.

At the other side part of the escutcheon 10 is formed a hinge member 40. Second top and bottom projectors 41, 42 project downwardly on the top part of the hinge member 40 and upwardly on the bottom part of the hinge member 40. An insertion groove 12 is formed at a central face of the other side part of the escutcheon 10. A second longitudinal hooking groove 26 is installed in the corresponding side part of the front panel 20 such that the second longitudinal hooking groove 26 can be caught by the second projectors 42 projecting on the top and bottom parts of the hinge member 40. An insertion projecting part 22 is installed in the corresponding side part of the front panel such that the insertion projecting part 22 can be inserted into the insertion groove 12.

An elastic member 30 is installed on the desired position of the front face of the escutcheon 10 for elastically pushing the front panel 20.

Hereinafter, an operation of the conventional panel detaching apparatus for a car-mounted audio system will be described.

In order to mount the front panel 20 onto the escutcheon 10, an operator catches the second projectors 42 of the hinge member 40 of the escutcheon 10 with the second longitudinal hooking groove 26, and he inserts the insertion projecting part 22 of the front panel 20 into the insertion groove 12. Thereby, one side of the front panel 20 and one side of the escutcheon 10 are connected with each other.

Thereafter, he pushes the front panel 20 toward the escutcheon 10, and the front panel 20 is turned toward the escutcheon 10 about the rotating axis of the hinge member until the first hooked projector 54 fastens the first engagement holes 24.

When the front panel 20 has been mounted at the escutcheon 10, An elastic member 30 installed on the front face of the escutcheon 10 elastically keeps pushing the front panel 20.

In this state, it becomes possible to operate the car-mounted audio system by pressing plural operation knobs installed at the front panel 20.

In order to detach the front panel 20 from the escutcheon 10, an operator presses the ejecting knob 60 installed in the front face of the escutcheon 10, and the rotating piece 58 of the hook assembly 50 is rotated, and then the first hooked projectors 54 are rotated to be released from the first engagement holes 24 of the front panel 20.

Due to the elastic member 30 which is installed on the front face of the escutcheon 10 and elastically keeps pushing the front panel 20, the front panel 20 is rotated about the hinge member 40. Thus, the first engagement holes 24 of the rotated front panel 20 are released from the first hooked projectors 54 of the escutcheon 10.

In this way, the front panel 20 is detached from the escutcheon 10.

According to the conventional panel detaching apparatus for car-mounted audio system, in order to mount the front panel 20 onto the escutcheon 10, an operator must catch the second projectors 42 of the hinge member 40 of the escutcheon 10 with the second longitudinal hooking groove 26, and he must insert the insertion projecting part 22 of the front panel 20 into the insertion groove 12, and thereby one side of the front panel 20 and one side of the escutcheon 10 are connected with each other. Thereafter, he must have the front panel 20 to be rotated toward the escutcheon 10 about the rotating axis of the hinge member until the first hooked projector 54 fastens the first engagement holes 24.

Accordingly, since the operator of the car-mounted audio system must go through the above mentioned order to mount the front panel 20 onto the escutcheon 10, the method for mounting the front panel onto escutcheon is somewhat difficult.

SUMMARY OF THE INVENTION

The present invention has been proposed to overcome the above described problems in the prior art, and accordingly it is an object of the present invention to provide a panel detaching apparatus for a car-mounted audio system capable of detaching with ease a front panel from the car-mounted audio system body.

To achieve the above objects, the present invention provides a panel detaching apparatus for a car-mounted audio system comprising:

first elastic holding means for being installed on a front face of an escutcheon for receiving a front panel of the car-mounted audio system, the first elastic holding means having a first elastic member and a first holding rod, the first elastic member being projected on the escutcheon, the first elastic member having a first elastic restoring force working in a parallel direction with the front face of the escutcheon, the first holding rod being formed at a top part of the first elastic member, and the first holding rod being arranged parallel with the front face of the escutcheon, and at the same time, orthogonally to a working direction of the first elastic restoring force of the first elastic member;

second elastic holding means for being installed symmetrically with the first elastic holding means on the front face of the escutcheon for receiving the front panel of the car-mounted audio system, the second elastic holding means having a second elastic member and a second holding rod, the second elastic member being projected on the escutcheon, the second elastic member having a second elastic restoring force working in the parallel direction with the front face of the escutcheon, the second holding rod being formed at a top part of the second elastic member, and the second holding rod being arranged parallel with the front face of the escutcheon, and at the same time, orthogonally to the working direction of the second elastic restoring force of the second elastic member; and first and second engagement parts formed on the front panel, and at the same time, formed at corresponding positions to the first and second holding rods of the escutcheon, into which the first and second holding rods are respectively inserted while the first and second elastic members have the first and second elastic restoring forces working toward each other, so that the first and second holding rods can hold the front panel by the elastic restoring forces working toward each other.

Releasing means is formed at a corresponding position of the front panel to the first holding rod of the first holding means, so that when the first holding rod is pressed by the releasing means, the first holding rod is released from the first engagement part of the front panel.

A restoring spring is formed near the first holding means on the escutcheon, and the restoring spring is in a pressed state for giving pressure to the front panel.

According to this construction, in order to mount the front panel onto the escutcheon, an operator only has to push the front panel onto the escutcheon.

That is, when the operator pushes the front panel onto the escutcheon, the first and second holding rods of the first and second elastic means are respectively inserted into first and second engagement parts formed on the front panel. At this time, the first and second elastic members have the first and second elastic restoring forces working toward each other, so that the first and second holding rods can tightly hold the front panel by the elastic restoring forces working toward each other. Thereby, the front panel becomes tightly fixed onto the escutcheon.

Accordingly, since the operator of the car-mounted audio system does not need to know the special order for mounting the front panel onto the escutcheon, the method for mounting the front panel onto escutcheon becomes very easy.

BRIEF DESCRIPTION OF THE DRAWINGS

The above objects and other advantages of the present invention will become more apparent by describing in detail preferred embodiments thereof with reference to the attached drawings in which:

FIG. 2 is a cross-sectional plane view for showing a state that a panel is detached onto an escutcheon by using a panel detaching apparatus for a car-mounted audio system according to the present invention;

DETAILED DESCRIPTION OF THE PREFERRED EMBODIMENTS

Hereinafter, an embodiment of the present invention will be described in detail with reference to the accompanying drawings.

Figure 1B:
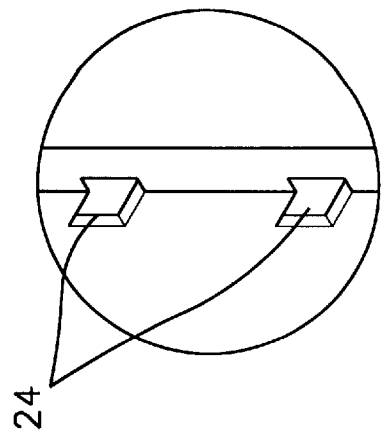
FIG. 1 is an exploded perspective view of the conventional panel detaching apparatus for a car-mounted audio system.
Figure 1A:
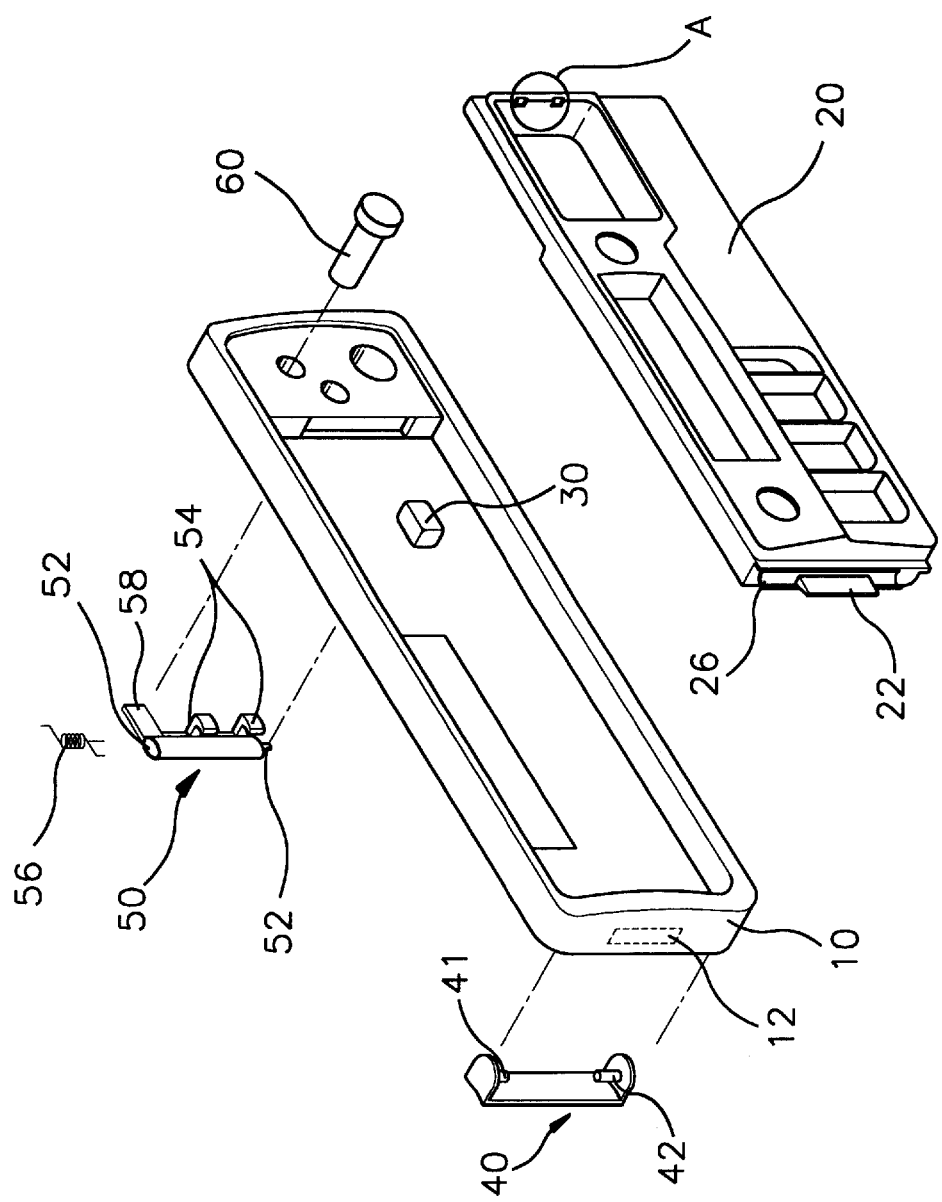
Figure 3:
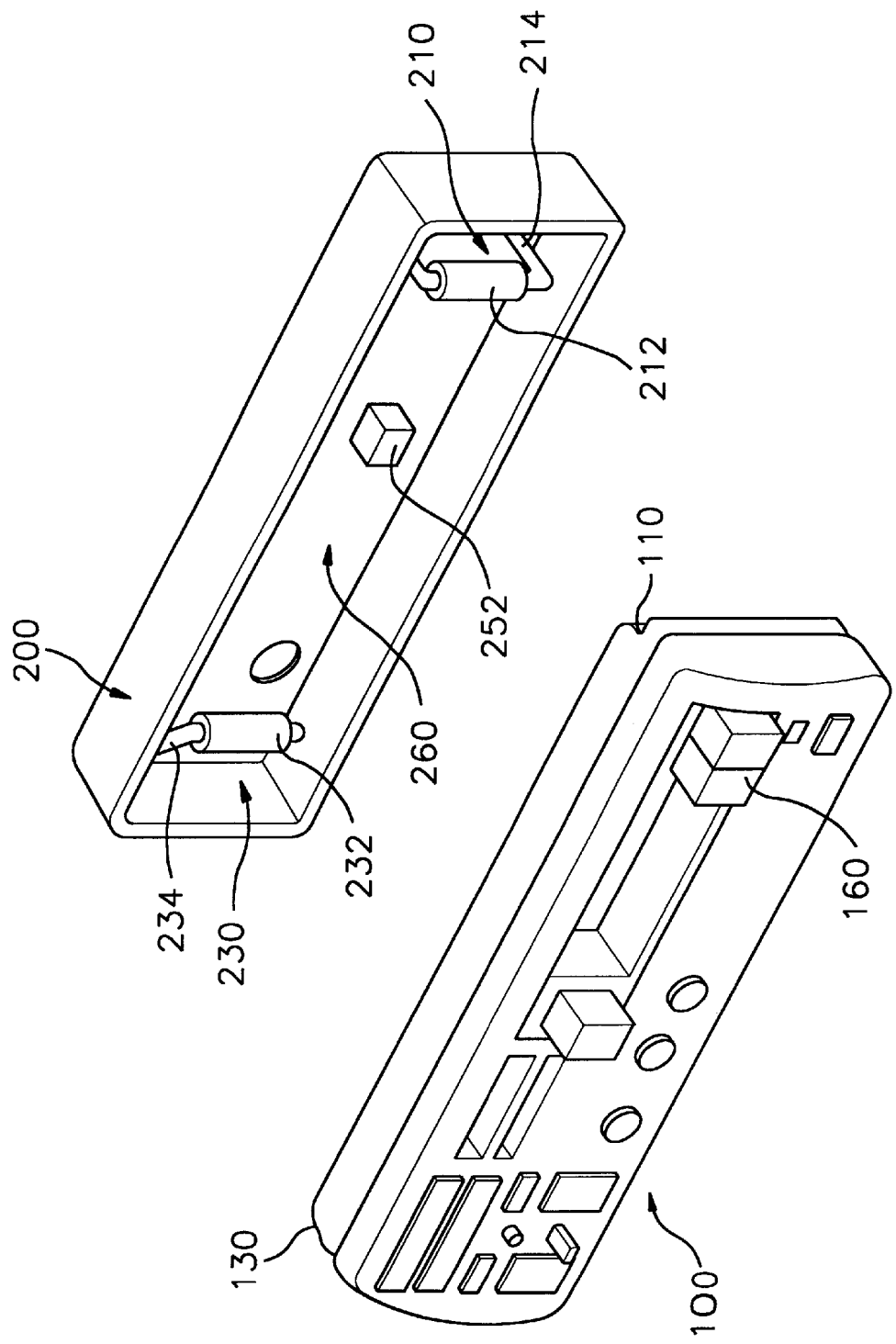
FIG. 3 is an exploded perspective view for showing the panel detaching apparatus for the car-mounted audio system in FIG. 2.
Figure 4:
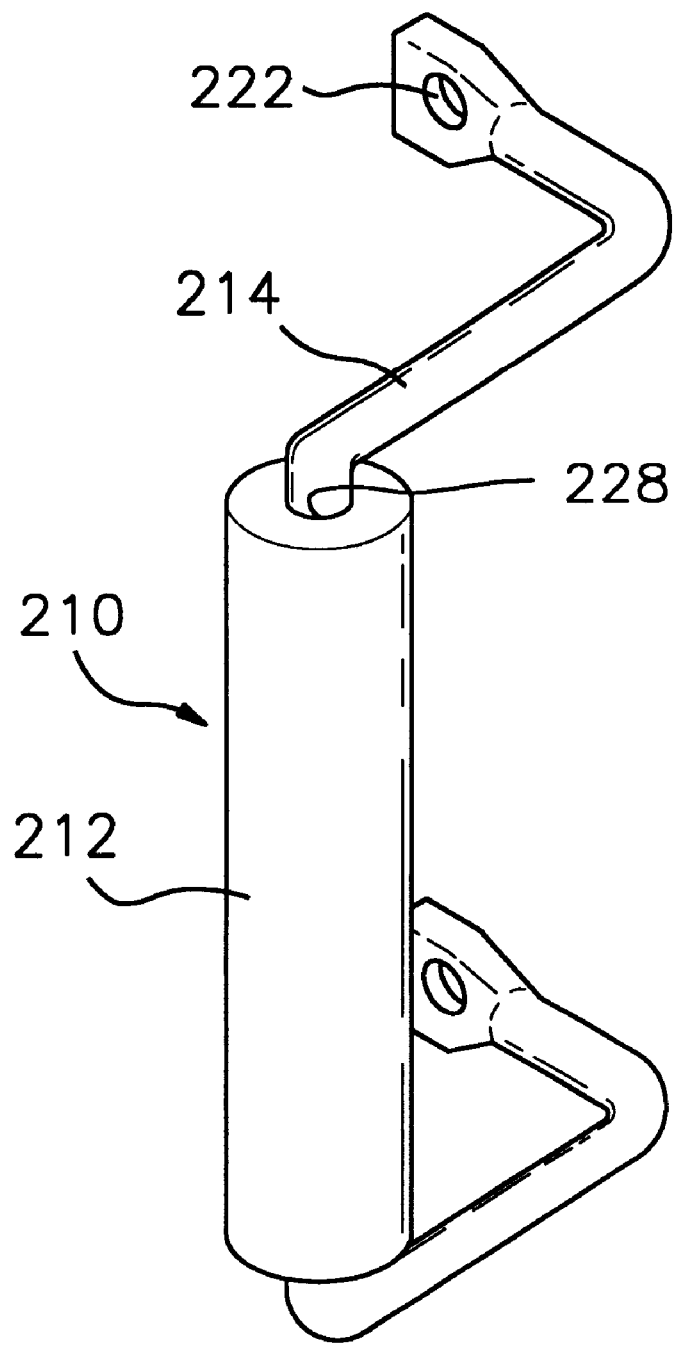
FIG. 4 is an enlarged perspective view of a first elastic holding member of the panel detaching apparatus for the car-mounted audio system in FIG. 2.

FIG. 2 is a cross-sectional plane view for showing a state that a panel is detached onto an escutcheon by using a panel detaching apparatus for a car-mounted audio system according to the present invention. FIG. 3 is an exploded perspective view for showing the panel detaching apparatus for the car-mounted audio system in FIG. 2. FIG. 4 is an enlarged perspective view of a first elastic holding member of the panel detaching apparatus for the car-mounted audio system in FIG. 2.

An escutcheon 200 for receiving a front panel 100 is formed at the front of car-mounted audio system body.

A first elastic holding member 210 and a second elastic holding member 230 are installed symmetrically with each other on a front face of the escutcheon 200, and at the same time, on the horizontal axis of the escutcheon 200.

The first elastic member 214 of the first elastic holding member 210 consists of two rod springs which are projected on the front face of the escutcheon 200 and arranged in the vertical direction of the escutcheon 200. The first elastic member 214 can has various shapes, for example, U type spring or plate spring. Each of the rod springs has a bottom end penetrating through the escutcheon 200. The penetrating bottom end is fixed on a back surface of the escutcheon 200. For example, a boss 220 with a thread 224 is installed near the part which is penetrated by the bottom end of the rod spring on the escutcheon 200. The bottom end of the rod spring has a through hole 222. A screw 218 piercing through washer 226 is inserted through the through hole 222 of the rod spring, and then screws the boss 220 installed on the escutcheon 200. Thus, the rod spring is screwed by the screw 218 to be fixed at the escutcheon 200.

A first holding rod 212 of the first elastic holding member 210 is formed by connecting two top ends of the two rod springs. Therefore, first holding rod 212 is formed orthogonally to the longitudinal axis of the escutcheon 200. The first holding rod 212 has a cylindrical shape, and has both ends with recesses 228. The two top ends of the two rod springs are inserted into the holding rod 212 to be fixed at the holding rod 212. The holding rod 212 is preferably formed by a cushioning material capable of absorbing impacts.

The second elastic holding member 230 is installed symmetrically with the first elastic holding member 210 on the front face of the escutcheon 200. The second elastic member 234 of the second elastic holding member 230 consists of two rod springs which are projected on the front face of the escutcheon 200 and arranged in the vertical direction of the escutcheon 200. The second elastic member 234 can have various shapes, for example, U type spring or plate spring. Each of the rod springs has a bottom end penetrating through the escutcheon 200. The penetrating bottom end is fixed on the back surface of the escutcheon 200. For example, a boss 240 with a thread 244 is installed near the part which is penetrated by the bottom end of the rod spring on the escutcheon 200. The bottom end of the rod spring has a through hole 242. A screw 238 piercing through washer 246 is inserted through the through hole 242 of the rod spring, and then screws the boss 240 installed on the escutcheon 200. Thus, the rod spring is screwed by the screw 238 to be fixed at the escutcheon 200.

A second holding rod 232 of the second elastic holding member 230 is formed by connecting two top ends of the two rod springs. Therefore, second holding rod 232 is formed orthogonally to the longitudinal axis of the escutcheon 200. The second holding rod 232 has a cylindrical shape, and has both ends with recesses. The two top ends of the two rod springs are inserted into the holding rod 232 to be fixed at the holding rod 232. The holding rod 232 is preferably formed by the cushioning material capable of absorbing impacts.

The first elastic holding member 210 and the second elastic holding member 230 are pressed in the opposite directions to each other when the front panel 100 is inserted. Thus, when the front panel has been mounted on the escutcheon 200, the first and second springs 214, 234 have the restoring force working toward the center.

First and second engagement recesses 110, 130 are respectively formed on both side surfaces of the front panel 100. The first and second elastic holding members 210, 230 of the escutcheon 200 and the first and second hooking grooves of both side surfaces of the front panel 100 are so positioned that the first and second elastic holding members 210, 230 can be inserted into the first and second hooking grooves. When the front panel 100 is mounted on the escutcheon 200, the first and second holding rods 212, 232 are inserted into the first and second engagement recesses 110, 130, and the front panel 100 is tightly held on the escutcheon 200 by the elastic restoring forces of the first and second elastic members 214, 234 working toward each other. The borders between the surface of the front panel 100 and the first and second engagement recesses 110, 130 are formed with a smooth curve, so that the first and second holding rods 212, 232 can be smoothly inserted into the first and second engagement recesses 110, 130.

A releasing member 160 is formed at a corresponding position of the front face of the front panel 100 with the first holding rod 212 of the first elastic holding member 210. The releasing member 160 has a cylindrical shape. One end of the releasing member 160 is an ejecting knob 161 which projects onto the front face of the front panel 100 for being pressed by the operator in order to detach the front panel 100. The other end of the releasing member 160 is installed inside the front panel 100 and is formed with a slope, so that when the releasing member is pressed, the releasing member moves toward the first holding rod 212 thereby pushing out the first holding rod 212 according to the slope until the first holding rod 212 is released from the first engagement recess 110.

The other end of the releasing member 160 installed inside the front panel 100 is provided with a fixing shaft 164. The fixing shaft 164 is to be inserted into a shaft holder 170 installed on the opposite side in the front panel 100. The fixing shaft 164 is inserted through a first spring 166 with the restoring force. The releasing member 160 is elastically projected from the front face of the front panel 100 due to the repelling force of the first spring 166.

An elastic member 250 is formed near the first holding member 210 on the escutcheon 200 for elastically pushing out the front panel 100.

The elastic member 250 has an elastic cover 252 installed in projected state from the front face of the escutcheon 100 and a second spring 254 for giving the elastic cover 252 the elastically rebounding force.

At this time, the restoring force of the second spring 254 is preferably larger than that of the first spring 166 so that when the first spring 166 is pushed, the second spring 254 can push the front panel 100 out.

Meanwhile, the first engagement recess 110 is provided with an opening through which the releasing member 160 is in contact with the first holding rod 212 and pushes out the first holding rod 212, so that the releasing member 160 can push the first holding rod 212 out, and thereby the engagement between the first engagement recess 110 and the first holding rod 212 can be released. Alternatively, the first engagement recess 110 can be provided with the contact face made of a thin and flexible material so that the releasing member 160 in contact with the first holding rod 212 can push the first holding rod 212 out.

Hereinafter, an operation of the panel detaching apparatus for the car-mounted audio system according the present invention will be described.

First, an operator pushes the front panel 100 onto the escutcheon 200 in order to mount the front panel 100 on the escutcheon 200.

At this time, the back surface of the front panel 100 gives pressure to the first and second elastic holding members 210, 230, so the rod springs of the first elastic member 214 of the first elastic holding member 210 and the rod springs of the second elastic member 234 of the second elastic holding member 230 are respectively pushed out in the opposite directions. Thus, the first and second elastic members 214, 234 have the restoring forces toward the center.

If the operator pushes the front panel 100 to an appropriate position, the first and second holding rods 212, 232 of the first and second elastic holding members 210, 230 of the escutcheon 200 are hooked into the first and second engagement recesses 110, 130. The front panel 100 is firmly fixed at the escutcheon 200.

As one embodiment, the operator can simultaneously push both ends of the front panel 100 so that the first and second holding rods 212, 232 of the escutcheon 200 can be simultaneously hooked into the first and second engagement recesses 110, 130 of the front panel 100. As another embodiment, the operator can firstly push any one end of the front panel 100 so that the first holding rod 212 of the escutcheon 200 can be firstly hooked into the first engagement recess 110 of the front panel 100, or the second holding rod 232 of the escutcheon 200 can be firstly hooked into the second engagement recess 130 of the front panel 100.

At this time, the front panel 100 gives pressure to the elastic cover 252 projected from the front face of the escutcheon 100, and thus is in an elastically recoverable state by the pressed second spring 254.

Thus, the front panel 100 is mounted on the escutcheon 200, and the car audio system is operable by using some contact terminals.

While the fixed shaft 164 of the releasing member 160 is inserted into the shaft holder 170, the first holding rod 212 held in the first engagement recess 110 is released from the first engagement recess 110 by the slope 162. Simultaneously with release of the first holding rod 212, the front panel 100 pressed by the second spring 254 is pushed out from the escutcheon 200 by the restoring force of the second spring 254. Since the restoring force of the second spring 254 is larger than that of the first spring 166, the second spring 254 can push out the front panel 100 when the first spring 166 is pressed by the operator.

Meanwhile, when the pressure is released from the ejecting knob 161, the releasing member 160 returns to the original position by the restoring force of the first spring 166.

According to this construction, in order to mount the front panel 100 onto the escutcheon 200, an operator only has to push either side or both sides of the front panel 100 onto the escutcheon 200. That is, when the operator presses the front panel 100 onto the escutcheon 200, the first and second holding rods 212, 232 of the first and second elastic members 210, 230 are respectively inserted into the first and second engagement recesses 110, 130 formed on both side faces of the front panel 100. At this time, the first and second elastic members 210, 230 have the first and second elastic restoring forces working toward each other, so that the first and second holding rods 212, 232 can be tightly fixed in the first and second engagement recesses 110, 130 by the elastic restoring forces working toward each other. Thereby, the front panel 100 becomes tightly held on the escutcheon 100.

Moreover, according to this construction, in order to detach the front panel 100 from the escutcheon 200, an operator only has to push the ejecting knob 161 installed on the front panel 100. That is, when the operator presses the ejecting knob 161, the releasing member 160 with the ejecting knob 161 pushes out the first holding rod 212 according to the slope in the side direction of the front panel 100. The front panel 100 becomes detached from the escutcheon 200 by the restoring force of the elastic member 250 which has elastically pressed the front panel 100.

Accordingly, since the operator of the car-mounted audio system does not need to know a special sequence for mounting the front panel onto the escutcheon, the method for mounting the front panel onto escutcheon becomes very easy.

It is understood that various other modifications will be apparent to and can be readily made by those skilled in the art without departing from the scope and spirit of this invention. Accordingly, it is not intended that the scope of the claims appended thereto be limited to the description as set forth herein, but rather that the claims be constructed as encompassing all the features of the patentable novelty that reside in the present invention, including all the features that would be treated as equivalents thereof by those skilled in the art to which this pertains.

What is claimed is:

1. A panel detaching apparatus for a car-mounted audio system comprising:

an escutcheon installed on a front portion of a body of the car-mounted audio system;

a front panel installed on a front side surface of the escutcheon;

first elastic holding means for being installed on a front face of the escutcheon, the first elastic holding means having a first elastic member and a first holding rod, the first elastic member being projected on the escutcheon, the first elastic member having a first elastic restoring force working in a parallel direction with the front face of the escutcheon, the first holding rod being formed at a top part of the first elastic member, and the first holding rod being arranged parallel with the front face of the escutcheon, and at the same time, orthogonally to a working direction of the first elastic restoring force of the first elastic member, wherein the first elastic member has a bottom end penetrating through the escutcheon, a bottom end of the first elastic member has a through hole, a boss with a thread is installed near the part which is penetrated by the bottom end of the first elastic member on a back surface of the escutcheon, a screw piercing through washer is inserted through the through hole of the first elastic member, the boss installed on the escutcheon is screwed by the screw, and the bottom end with the through hole of the first elastic member is screwed by the screw, and thereby the penetrating bottom end of the second elastic member is fixed on the escutcheon;

second elastic holding means for being installed symmetrically with the first elastic holding means on the front face of the escutcheon, the second elastic holding means having a second elastic member and a second holding rod, the second elastic member being projected on the escutcheon, the second elastic member having a second elastic restoring force working in the parallel direction with the front face of the escutcheon, the second holding rod being formed at a top part of the second elastic member, and the second holding rod being arranged parallel to the front face of the escutcheon, and at the same time, orthogonally to the working direction of the second elastic restoring force of the second elastic member, wherein the second elastic member has a bottom end penetrating through the escutcheon, a bottom end of the second elastic member has a through hole, a boss with a thread is installed near the part which is penetrated by the bottom end of the second elastic member on a back surface of the escutcheon, a screw piercing through washer is inserted through the through hole of the second elastic member, the boss installed on the escutcheon is screwed by the screw, and the bottom end with the through hole of the second elastic member is screwed by the screw, and thereby the penetrating bottom end of the second elastic member is fixed on the escutcheon; and first and second engagement parts formed on the front panel, and at the same time, formed at corresponding positions to the first and second holding rods of the escutcheon, into which the first and second holding rods are respectively inserted while the first and second elastic members have the first and second elastic restoring forces working toward each other, so that the first and second holding rods can hold the front panel by the elastic restoring forces working toward each other.

2. A panel detaching apparatus for a car-mounted audio system according to claim 1, wherein first and second engagement parts into which the first and second elastic holding means of the escutcheon are respectively hooked are formed on both side surfaces of the front panel, so that the front panel can be tightly held on the escutcheon by the elastic restoring forces of the first and second elastic members working toward each other.

3. A panel detaching apparatus for a car-mounted audio system according to claim 1, wherein each of the first and the second elastic members has two rod springs which are projected on the front face of the escutcheon and arranged in a vertical direction of the escutcheon.

4. A panel detaching apparatus for a car-mounted audio system according to claim 1, wherein an elastic member is formed near the first elastic holding means on the escutcheon for elastically pushing out the front panel.

5. A panel detaching apparatus for a car-mounted audio system according to claim 1, wherein the borders between the surface of the front panel and the first and second engagement parts are formed with smooth curve, and thereby the first and second holding rods are smoothly inserted into the first and second engagement parts.

6. A panel detaching apparatus for a car-mounted audio system comprising:

an escutcheon installed on a front portion of a body of the car-mounted audio system;

a front panel installed on a front surface of the escutcheon;

first elastic holding means for being installed on a front face of the escutcheon, the first elastic holding means having a first elastic member and a first holding rod, the first elastic member being projected on the escutcheon, the first elastic member having a first elastic restoring force working in a parallel direction with the front face of the escutcheon, the first holding rod being formed at a top part of the first elastic member, and the first holding rod being arranged parallel with the front face of the escutcheon, and at the same time, orthogonally to a working direction of the first elastic restoring force of the first elastic member;

second elastic holding means for being installed symmetrically with the first elastic holding means on the front face of the escutcheon, the second elastic holding means having a second elastic member and a second holding rod, the second elastic member being projected on the escutcheon, the second elastic member having a second elastic restoring force working in the parallel direction with the front face of the escutcheon, the second holding rod being formed at a top part of the second elastic member, and the second holding rod being arranged parallel to the front face of the escutcheon, and at the same time, orthogonally to the working direction of the second elastic restoring force of the second elastic member;

first and second engagement parts formed on the front panel, and at the same time, formed at corresponding positions to the first and second holding rods of the escutcheon, into which the first and second holding rods are respectively inserted while the first and second elastic members have the first and second elastic restoring forces working toward each other, so that the first and second holding rods can hold the front panel by the elastic restoring forces working toward each other; and releasing means formed at a corresponding position of the front panel to the first holding rod of the first holding means, the releasing means having an ejecting knob projected from a front face of the front panel, and thereby when the first holding rod is pressed by the releasing means, the first holding rod is released from the first engagement part of the front panel.

7. A panel detaching apparatus for a car-mounted audio system according to claim 6, wherein an end of the releasing means in contact with the first holding rod inside the front panel is formed with a slope, and thereby when the releasing means is pressed, the releasing means pushes out the first holding rod according to the slope until the first holding rod is released from the first engagement part.

8. A panel detaching apparatus for a car-mounted audio system according to claim 6, wherein the first engagement part is provided with an opening through which the releasing means is in contact with the first holding rod and is able to push the first holding rod which is hooked in the first engagement part.

9. A panel detaching apparatus for a car-mounted audio system according to claim 6, wherein the first engagement part is provided with the contact face made of a thin and flexible material, and thereby the releasing means in contact with the first holding rod can push the first holding rod out.

10. A panel detaching apparatus for a car-mounted audio system according to claim 6, wherein the releasing means has an end with a fixing shaft installed inside the front panel, the fixing shaft is in an inserted state into a shaft holder installed on the opposite side in the front panel, the fixing shaft is inserted through a first spring with the restoring force, and the releasing means is elastically projected from the front face of the front panel due to a restoring force of the first spring.

11. A panel detaching apparatus for a car-mounted audio system according to claim 10, wherein an elastic member with a second spring is formed near the first elastic holding member on the escutcheon for giving pressure to the front panel, and a restoring force of the second spring is preferably larger than that of the first spring, and thereby when the first spring is pushed, the second spring pushes out the front panel.

\* \* \* \* \*